US010010028B1

(12) United States Patent
Dilts et al.

(10) Patent No.: US 10,010,028 B1
(45) Date of Patent: Jul. 3, 2018

(54) CHOPPER ASSEMBLY FOR A HARVESTER WITH AN AUTOMATIC BLADE RESET MECHANISM

(71) Applicant: CNH Industrial America, LLC, New Holland, PA (US)

(72) Inventors: Mark D. Dilts, New Holland, PA (US); Nathan E. Isaac, Lancaster, PA (US); Cooper Wilhelm Linde, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/642,546

(22) Filed: Jul. 6, 2017

(51) Int. Cl.
| *A01F 29/09* | (2010.01) |
| *A01F 29/06* | (2006.01) |
| *A01F 7/06* | (2006.01) |
| *A01F 12/40* | (2006.01) |
| *A01D 41/00* | (2006.01) |

(52) U.S. Cl.
CPC ............ *A01F 29/095* (2013.01); *A01F 29/06* (2013.01); *A01D 41/00* (2013.01); *A01F 7/06* (2013.01); *A01F 12/40* (2013.01)

(58) Field of Classification Search
CPC ......... A01D 41/00; A01D 90/04; A01F 29/06; A01F 29/095; A01F 29/01; A01F 12/40; A01F 15/10; A01F 15/106; A01F 7/06; B02C 13/284
USPC ......... 56/341, 364; 241/73, 190, 101.2, 240, 241/243; 460/78, 109, 112
See application file for complete search history.

(56) References Cited

U.S. PATENT DOCUMENTS

| 3,005,637 | A |   | 10/1961 | Hetteen |   |
| 3,738,584 | A |   | 6/1973  | Gronberg |   |
| 4,836,457 | A | * | 6/1989  | Greiner | B02C 13/284 |
|           |   |   |         |         | 241/73 |
| 4,961,305 | A |   | 10/1990 | Ostrup et al. |   |
| 6,152,820 | A | * | 11/2000 | Heidjann | A01F 12/40 |
|           |   |   |         |         | 460/112 |
| 7,252,587 | B2 | * | 8/2007 | Viaud | A01D 90/04 |
|           |   |   |         |         | 460/109 |
| 7,584,594 | B2 | * | 9/2009 | Viaud | A01F 15/106 |
|           |   |   |         |         | 56/341 |
| 8,006,926 | B2 | * | 8/2011 | Benes | A01F 12/40 |
|           |   |   |         |         | 241/243 |
| 9,137,949 | B2 |   | 9/2015  | Isaac et al. |   |
| 9,723,793 | B2 | * | 8/2017 | Meiners | A01F 29/095 |

FOREIGN PATENT DOCUMENTS

EP        2910105        8/2015

* cited by examiner

*Primary Examiner* — Robert E Pezzuto
(74) *Attorney, Agent, or Firm* — Peter K. Zacharias; Patrick M. Sheldrake

(57) ABSTRACT

A chopper assembly for a harvester may include a blade reset assembly having an automatic blade reset mechanism configured to apply a force that urges the assembly to pivot about a pivot axis such a blade element supported by the blade reset assembly is biased towards an extended position. In addition, blade reset assembly may be configured to pivot against the force applied by the blade reset mechanism when the blade element is subjected to a sufficient counterforce force such that the blade element is moved towards a retracted position.

20 Claims, 12 Drawing Sheets

CHOPPER ASSEMBLY FOR A HARVESTER WITH AN AUTOMATIC BLADE RESET MECHANISM

FIELD OF THE INVENTION

The present subject matter relates generally to agricultural harvesters, such as combines, and, more particularly, to a chopper assembly for a harvester having an automatic blade reset mechanism.

BACKGROUND OF THE INVENTION

Harvesting equipment, such as agricultural combines, often use chopper assemblies, such as integral chopper assemblies or hood mounted chopper assemblies or systems, to transport material away from the threshing system and to also treat the material, e.g., by further cutting the material, as it is being transported away from the threshing system. A rotary chopper element or portion of the integral chopper system may be operated at or near 3,000 revolutions per minute (RPM) to transport the material from the threshing system to a spreading system. When operated at 3,000 RPM, the material is transported with the shortest mean length of cut to permit modern minimum tillage applications. In a less common embodiment, the integral chopper system may be operated at a speed of about 800 RPM to more gently transport the material from the threshing system to a spreading system and with considerably less chopping activity. When operated at this lower speed, the material can be transported to the spreading system with the longest length and least amount of damage.

Integral chopper systems typically have a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly may include chopper grate assembly spaced below and extending generally parallel to the rotary chopper element and a knife mounting assembly positioned generally beneath the chopper grate assembly.

Often, the counter knife assembly can have an adjustment mechanism that is operable to vary the spacing between a grate portion of the chopper grate assembly and the knife mounting assembly, as well as the degree of projection of the blade elements of the knife mounting assembly through the slots of the grate portion. The adjustment mechanism can be operated to move the knife mounting assembly between a fully engaged or inserted position with the blade elements of the knife mounting assembly extending through the slots towards the rotary chopper element and a fully retracted position in which the blade elements are fully withdrawn or retracted from the slots. In addition, the adjustment mechanism can move the blade elements to various positions between a fully engaged position and a fully retracted position.

When the knife mounting assembly is in an engaged position, either fully or partially, the crop residue can be chopped into smaller pieces by the cooperative actions of the knife blades or elements of the knife mounting assembly and the knife blades or paddles on the rotating rotary chopper element as the crop residue is moved and propelled rearward. The knife mounting assembly is usually positioned into an engaged position, either fully or partially, when the rotary chopper element is operated at or near 3,000 RPM and is usually positioned in a fully retracted position when the rotary chopper element is operated at 800 RPM to avoid excessive power requirements for the combine.

To avoid breakage of knives due to striking foreign objects ingested during harvesting, counter knife elements may be configured to deflect or break-away from their respective operating positions to a non-working position. However, conventionally, such configurations have required manual re-setting of the knife elements, which is undesirable.

In response, U.S. Pat. No. 9,137,949, the disclosure of which is hereby incorporated by reference herein in its entirety for all purposes, discloses an apparatus for re-setting counter knife elements to their operating position after striking a foreign object. While the apparatus of U.S. Pat. No. 9,137,949 provides numerous advantages over conventional manual reset systems, it is desirable for further improvements and/or enhancements to be made to counter knife reset systems in order to reduce their overall complexity while maintaining the desired functionality.

Accordingly, a chopper assembly for a harvester having an improved automatic blade reset mechanism would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a chopper assembly for a harvester. The chopper assembly may include a rotary chopper element and a chopper grate assembly spaced apart from the rotary chopper element to form a passageway therebetween for receipt of crop material. The chopper assembly may also include a blade bank including a plurality of blade elements with the blade bank being movable relative to the chopper grate assembly between an extended position at which the plurality of blade elements at least partially extend into the passageway and a retracted position at which the plurality of blade elements are at least partially retracted relative to the passageway. Additionally, the chopper assembly may include a bank support lumber configured to support the blade bank relative to the chopper grate assembly and a pivot support member non-rotatably coupled to the bank support member. Moreover, the chopper assembly may include a blade support body pivotally coupled to the pivot support member at a pivot axis defined between the pivot support member and the blade support member, with the blade support body being configured to be secured to at least one blade element of the plurality of blade elements of the blade bank. Further, the chopper assembly may include a blade reset mechanism coupled to the blade support body at a first mounting location. The blade reset mechanism may be configured to apply a force against the blade support body that urges the blade support body to pivot about the pivot axis such that the at least one blade element is biased towards the extended position. In addition, the pivot axis defined between the pivot support member and the blade support body may be located further away from the chopper grate assembly than the first mounting location.

in another aspect, the present subject matter is directed to a chopper assembly for a harvester. The chopper assembly may include a rotary chopper element and a chopper grate assembly spaced apart from the rotary chopper element to form a passageway therebetween for receipt of crop material. The chopper assembly may also include a blade bank including a plurality of blade elements, with the blade bank being movable relative to the chopper grate assembly between an extended position at which the plurality of blade elements at least partially extend into the passageway and a retracted position at which the plurality of blade elements are at least partially retracted relative to the passageway. In addition, the chopper assembly may include a bank support member configured to support the blade bank relative to the chopper grate assembly and a pivot support member non-rotatably coupled to the bank support member. Moreover, the chopper assembly may include a blade support body pivotally coupled to the pivot support member at a pivot axis defined between the pivot support member and the blade support member, with the blade support body being configured to be secured to at least one blade element of the plurality of blade elements of the blade bank. Additionally, a blade reset mechanism may be coupled directly between the pivot support member and the blade support body. The blade reset mechanism may be coupled to the blade support body at a first mounting location and to the pivot support member at a second mounting location. Further, the blade reset mechanism may be configured to apply a force against the blade support body that urges the blade support body to pivot about the pivot axis such that the at least one blade element is biased towards the extended position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
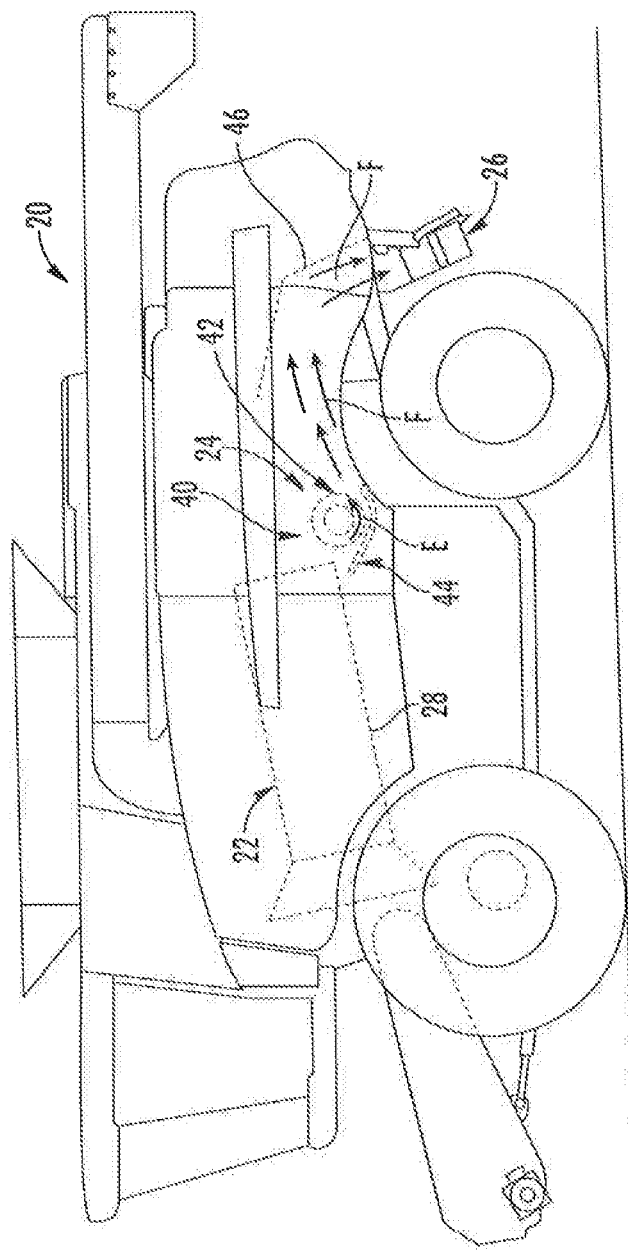
FIG. 1 illustrates a simplified, side view of one embodiment of an agricultural combine in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a chopper assembly for a harvester that includes a blade reset assembly having an automatic blade reset mechanism configured to apply a force that urges the assembly to pivot about a pivot axis such a blade element supported by the blade reset assembly is biased towards an extended position. In addition, the assembly may be configured to pivot against the force applied by the blade reset mechanism when the blade element is subjected to a sufficient counterforce force such that the blade element is moved towards a retracted position. As a result, when the blade element is contacted by a foreign object (e.g., a rock) during operation of the chopper assembly, the blade element may pivot downward with the disclosed assembly relative to an adjacent grate assembly from its extended position to its retracted position to allow the object to pass through the system without damaging the blade element.

As will be described below, the various components of the blade reset assembly may be assembled and/or oriented relative to one another to provide one or more differing pivot configurations. For instance, in one embodiment, the blade reset assembly may include a top pivot, bottom reset configuration in which the pivot axis for the assembly is located closer to the adjacent grate assembly than the mounting location at which the blade reset mechanism applies its biasing force against a corresponding blade support body of the assembly. Such a configuration may allow the assembly to have a minimized volume or height below the chopper pan surface, thereby minimizing its obstruction of the airflow pattern and/or the cleaning system below. Additionally, when the blade is impacted with the top pivot, the largest arc at the perimeter of the blade is minimized using the top pivot, bottom reset configuration, thereby allowing the length of the slots in the pan to be reduced to provide increased strength to the grate. In another embodiment, the blade reset assembly may include a bottom pivot, top reset configuration in which the pivot axis for the assembly is located further away from the adjacent grate assembly than the mounting location at which the blade reset mechanism applies its biasing force against the corresponding blade support body. Such a configuration may provide for an increased moment arm for the assembly, thereby allowing for easier blade retraction when a foreign object impacts the blade near the chopper pan surface (e.g., at the bottom portion or base of the blade).

Figure 2:
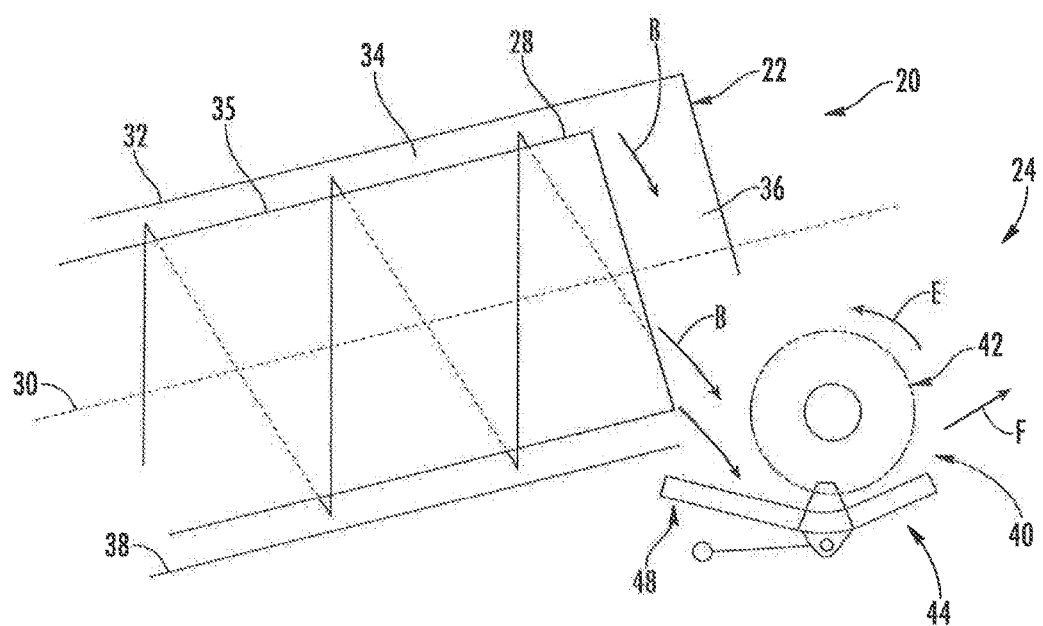
FIG. 2 illustrates a simplified, side view of one embodiment of a threshing system and a portion of a crop residue treatment and distribution system of the combine of FIG. 1.

Referring now to the drawings, FIGS. 1 and 2 illustrate one embodiment of an agricultural harvester, such as a combine 20, including a longitudinally axially arranged threshing system 22 and a crop residue treatment and distribution system 24 with a crop residue spreader 26. Threshing system 22 may include a cylindrical threshing rotor 28 within a rotor housing 32. The rotor 28 can be conventionally supported and rotatable in a predetermined direction, e.g., clockwise, about a rotational axis 30. In general, the rotor 28 may be configured to convey a flow of crop material in a helical flow path through a space 34 extending circumferentially around an outer cylindrical surface 35 of the rotor 28 and an inner circumferential surface 38 of the rotor housing 32. As the crop material is moved through the space 34, the crop, such as grain, legumes, and/or the like, can be loosened and separated from crop residue, such as husk and pods, and carried away in a conventional manner.

The crop residue may continue along the helical path through the space 34, and then be expelled, as denoted by arrows B in FIG. 2, into and through a discharge opening and passage 36, which can be an extension of space 34 at the downstream end of threshing rotor 28. The consistency of the flow of crop residue, volume thereof, and extent or pattern thereof, can vary, and may be a function of a variety of conditions, including, but not limited to, the speed of rotation of rotor 28, crop type, plant maturity, moisture content, and weather conditions. As an example, speeds for the rotor 28 may vary between just a few hundred RPM to over 1,000 RPM. Wheat and other small grains may have relatively small crop residue components, whereas other grains, such as corn, may have larger components, such as thick stalk segments, cob fragments, and large leaves.

In general, the crop residue treatment and distribution system 24 may include a transport and chopping assembly, such as integral chopper assembly 40 configured about an aft portion of the combine 20, sometimes hereinafter referred to as rotary assembly 40, having a rotary chopper element 42 rotatable in a direction E above a concave pan assembly, such as chopper grate assembly 44. The chopper assembly 40 is operatively connected downstream of the threshing system 22 to receive the flow of crop material from the threshing system 22. Rotary chopper element 42 may rotate at a rapid speed, so as to be capable of accelerating and propelling a flow of crop residue rearward within the confines of the rear end of the combine 20, as generally denoted by arrows F in FIGS. 1 and 2. Such rearward flow can be guided and directed by internal panels or shields, generally denoted by shields 46 in FIG. 1, to flow through a rear opening so as to be deposited directly onto a field, such as in a windrow, or to flow into a secondary crop residue chopper and/or spreader 26 for spreading in a swath on the field.

Figure 3:
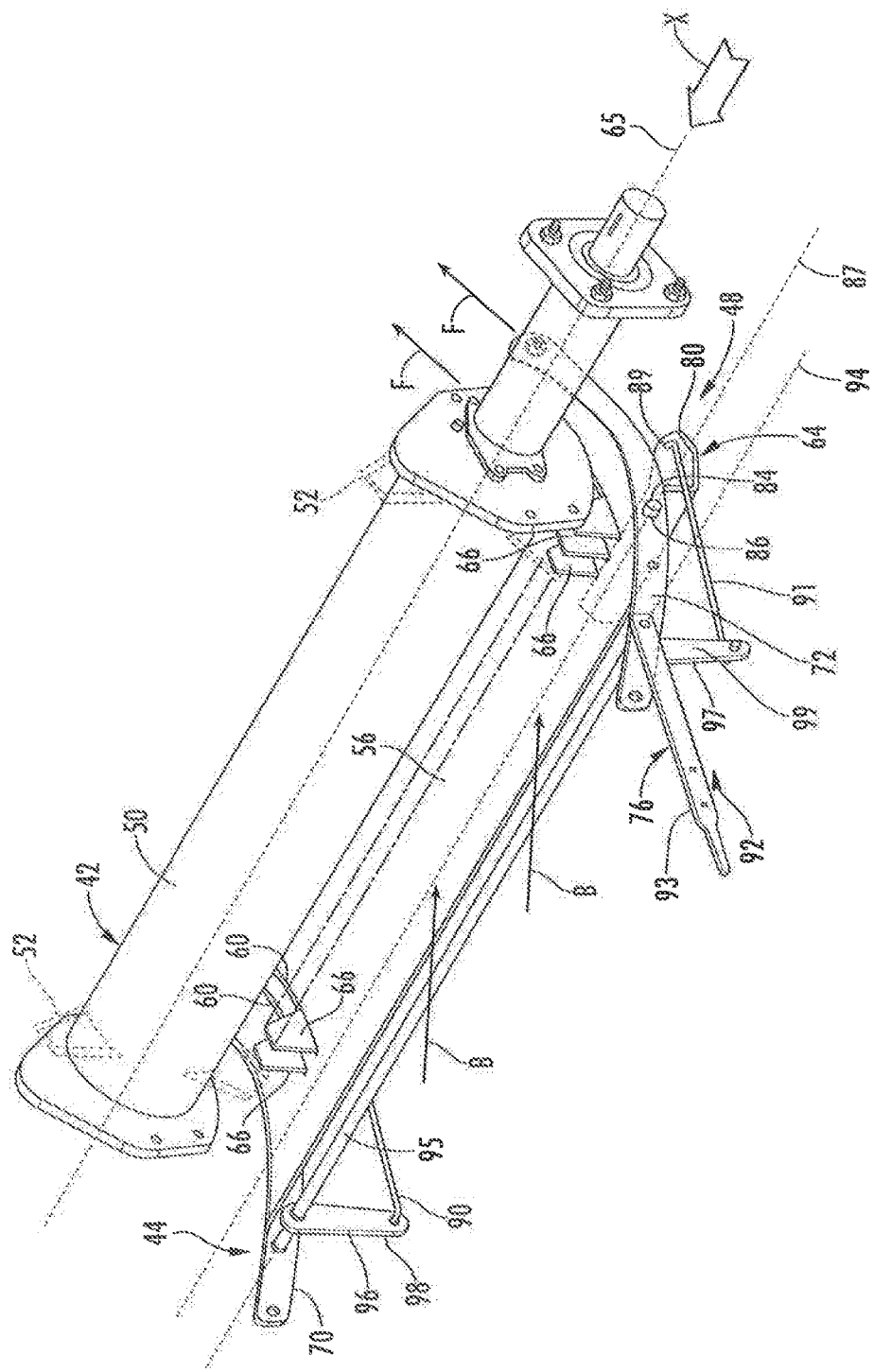
FIG. 3 illustrates an upper perspective view of one embodiment of an integral chopper assembly suitable for use within a combine, particularly illustrating a particular embodiment of a counter blade assembly.
Figure 4:
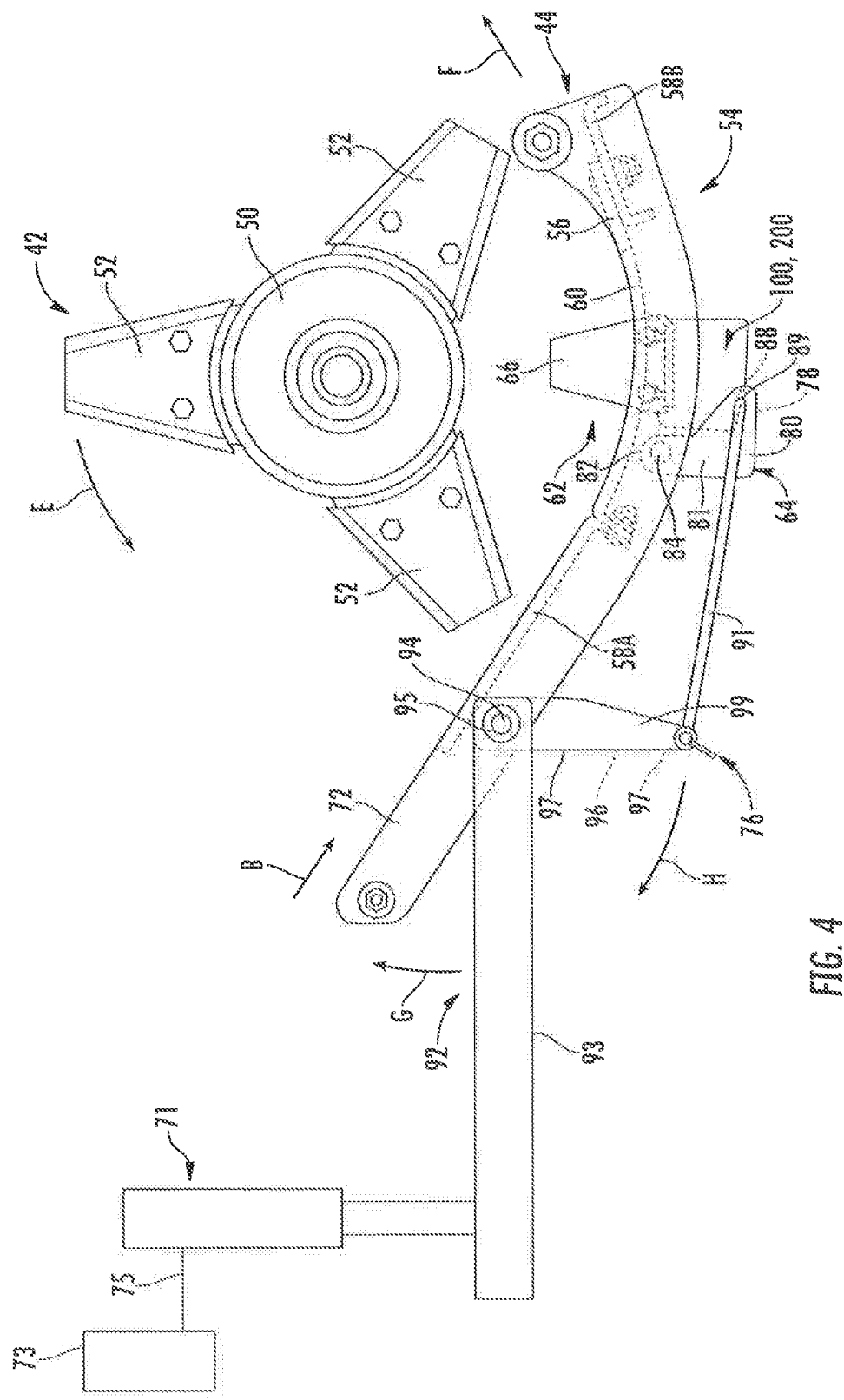
FIG. 4 illustrates a simplified, side view, generally viewed from position X in FIG. 3, of a portion of the integral chopper assembly of FIG. 3.

FIGS. 3-4 depict a portion of an integral chopper assembly 40 that includes not only a concave pan portion that employs a replaceable grate portion and an interruption plate downstream from the slots in the grate portion of the chopper grate assembly 44, but also a rotary chopper portion or element 42 that extends generally horizontally across the flow path of the crop residue above the chopper grate assembly 44. In several embodiments, the chopper grate assembly 44 may include a counter blade assembly 48. Additionally, the rotary chopper element 42 may include a cylindrical element or rotary member 50, and has a number of paddles or knife blades 52 mounted or affixed thereto at a plurality of mounting locations distributed about the periphery of the rotary member 50. The particular positioning, arrangement, and configuration of the paddles or knife blades 52 may be determined based on particular requirements to be satisfied.

Figure 5:
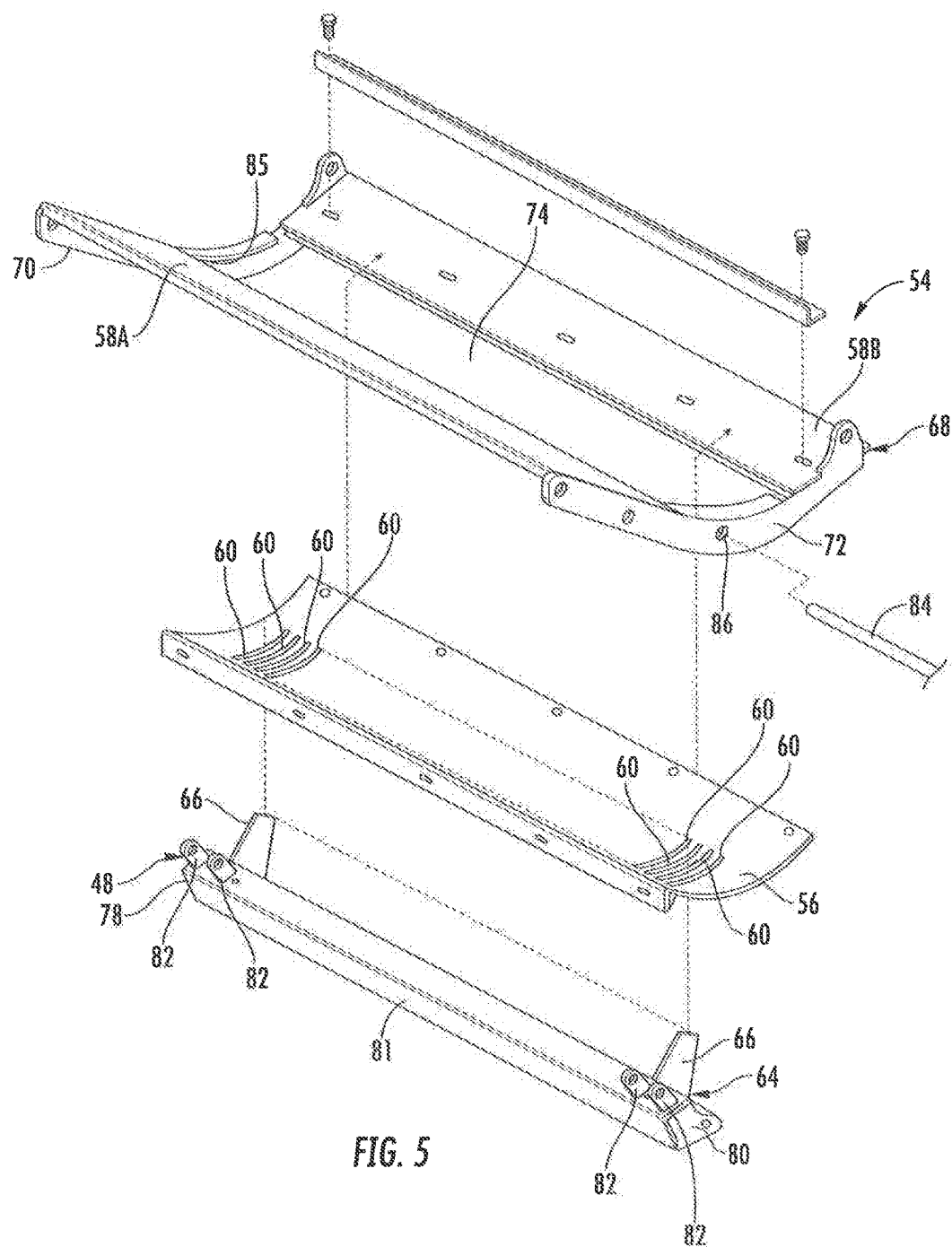
FIG. 5 illustrates an exploded, perspective view of various components of a concave pan portion of the integral chopper assembly of FIGS. 3 and 4.

FIG. 5 depicts in an exploded view of various components of the chopper grate assembly 44 of the integral chopper assembly 40, including a generally concave pan portion 54, sometimes hereinafter also referred to as a concave pan assembly. The concave pan portion 54 includes a grate portion 56 positioned between leading and trailing plate portions 58A and 58B that extends generally parallel to the rotary chopper element 42 and includes a plurality of spaced slots 60. Applicant's U.S. Pat. No. 7,553,225 further discloses details of such operation, which is incorporated by reference herein in its entirety for all purposes.

Referring back to FIG. 4, the rotary chopper element 42 and the grate portion 56 of the concave pan portion 54 of the chopper grate assembly 44 define a passageway 62 therebetween for the crop residue flow that is directed to the integral chopper assembly 40 for treatment thereby, such as crop residue flow B from the threshing system 22 (see FIG. 2). The slots 60 in grate portion 56 are generally elongated and extend along the grate portion 56 generally in the direction of the crop residue flow B.

Referring to FIGS. 3-5, the counter blade assembly 48 includes a stationary counter blade bank assembly (or simply blade bank 64) having a plurality of spaced knife or blade elements 66 positioned generally beneath and parallel to both the rotary chopper element 42 and the grate portion 56. The blade elements 66 are mounted at positions along the blade bank 64 that correspond to the slots 60 in the grate portion 56. For example, the slots 60 in the grate portion 56 may be sized and configured to permit the blade elements 66, when moved, to project through the slots 60.

As may be observed from FIG. 5, in an exemplary construction of the integral chopper assembly 40, the grate portion 56 may be provided as a separate element that can be easily mated, with the leading and trailing plate portions 58A, 58B of the concave pan portion 54, as a consequence of which the grate portion 56 may be easily removed if and when it becomes undesirably worn and replaced with a like element. As may be further observed from FIG. 5, the concave pan portion 54 includes a shell portion 68 that includes the leading and trailing plate portions 58A, 58B installed between opposed concave pan side walls or plates 70, 72, with an intermediate opening 74 between the leading and trailing plate portions 58A, 58B, into which the grate portion 56 may be inserted and installed.

Figure 6:
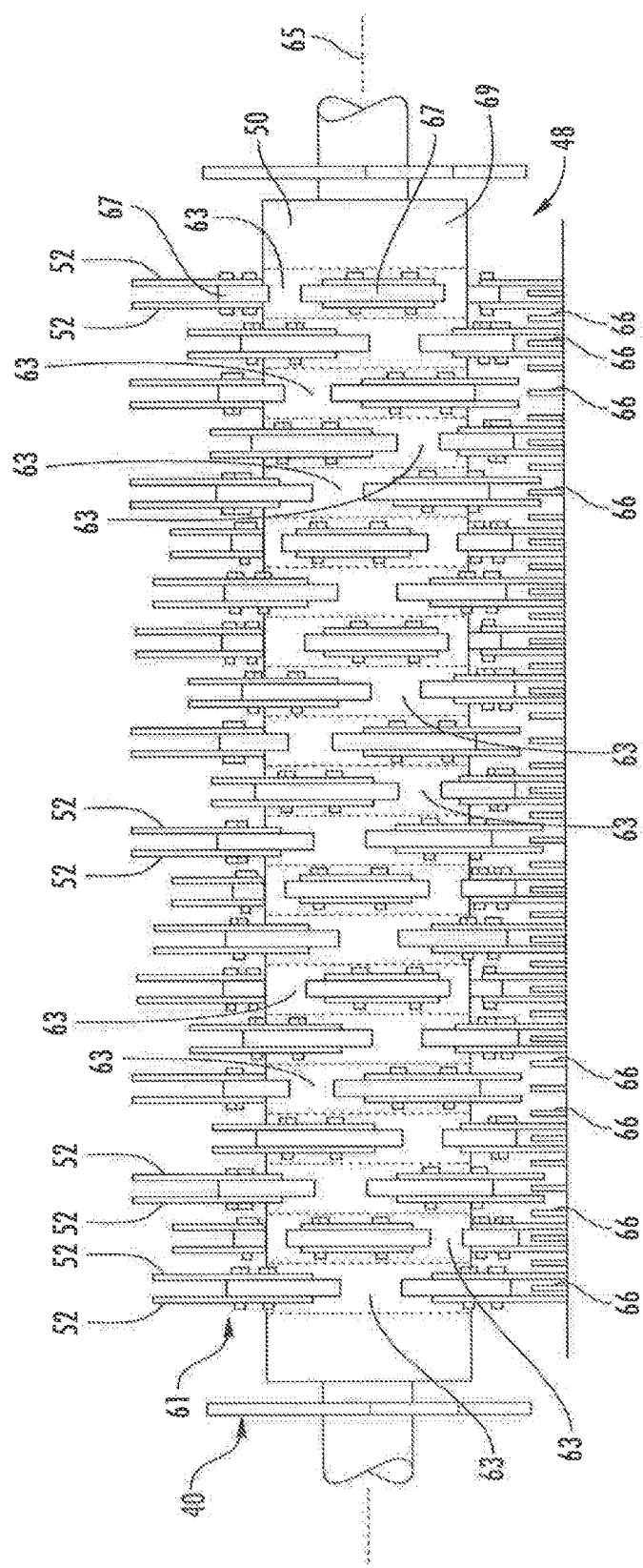
FIG. 6 illustrates a plan view looking forwardly from the rear of the integral chopper assembly shown in FIG. 3, particularly looking towards the rotary chopper element.

In general, the slots 60 and blade elements 66 may be appropriately positioned relative to knife blades 52 of the rotary chopper element 42 to permit the blade elements 66 and knife blades 52 to be interengagable with one another, so as to pass adjacent to one another without contacting one another. An exemplary embodiment of the interengagable movement of the blade elements 66 and knife blades 52 is illustrated in FIG. 6, which depicts the rotary element 42 and top portions of the blade elements 66 of the counter blade assembly 48 when the blade elements 66 project through the slots 60 of the grate portion 56 into the flow passageway 62. The knife blades 52 and blade elements 66 are so mounted that they are interengagable with one another during a chopping operation without contacting or interfering with one another.

In several embodiments, the integral chopper assembly 40 may include an adjustment mechanism 76 for adjustably varying the positioning of the blade bank assembly 64 relative to the grate portion 56 of the chopper grate assembly 44 between a fully engaged or extended position wherein the blade elements 66 of the blade bank assembly 64 extend through the slots 60 of the grate portion 56 of the chopper grate assembly 44 at a maximum projection and a partially or fully retracted position wherein the blade elements 66 project minimally, if at all, through the slots 60. The blade bank 64, which extends between first and second blade bank end plates 78, 80, is generally spaced from and parallel to both the rotary chopper element 42 and the grate portion 56 and extends between opposed side wall or side plates or plates 70, 72 of the concave pan portion 54.

The counter blade assembly 48 may also include a primary toolbar or bank support member 81, which is dimensioned to extend generally the width of the grate portion 56 between the blade bank end plates 78, 80, and is configured to support the blade bank 64. In one embodiment, the bank support member 81 includes spaced mounting eyelets 82 along one of its sides. Additionally, a shaft member 84 may extend through the mounting eyelets 82 to end connections 85, 86 on the respective opposed side plates 70, 72 of the concave pan portion 54. The shaft member 84, when so mounted through the end connections 85, 86, defines an engagement positioning axis 87 (see FIG. 3), sometimes hereinafter also referred to as swivel axis 87, about which the bank support member 82 and, thus, the blade bank 64 may be rotated or pivoted in an arc-like movement.

Additionally, the blade bank end plates 78, 80 may include lower portions 88, 89, which are operatively connected via respective positioning rods 90, 91 to a lever assembly 92. The lever assembly 92 can be operable to effect, through the coupled movement of positioning rods 90, 91, a rotation or pivoting of the bank support member 81 and the blade bank 64 about the swivel axis 87. The rotation or pivoting of the blade bank can be used to extend or retract the blade elements 66 into or from the flow passageway 62. In one embodiment, the lever assembly 92 includes an operable lever 93 coupled at axis 94 to a rotatable connecting rod 95 that extends between side plates or walls 70, 72 of the concave pan portion 54. The connecting rod 95 may be attached to support links 96, 97, which are respectively connected to positioning rods 90, 91.

When the lever 93 is operated, as denoted by arrow G in FIG. 4, the support links 96, 97 are caused to rotate thereby effecting rotational movement of end portions 98, 99 of the support links 96, 97 about axis 94, as denoted by arrow H in FIG. 4, consequent movement of the positioning rods 90, 91, and the resultant rotational movement of the blade bank assembly 64, including the bank support member 81 and the bank end plates 78 and 80, about the swivel axis 87. By thus operating, and then fixing the status of the lever assembly 92 at a given position, a user can conveniently alter and fix the positioning of the blade bank 64 relative to grate portion 56, thereby controlling to some extent the amount by which the blade elements 66 are permitted to project through slots 60.

As is generally understood, the ability to effect a repositioning of the blade bank 64 relative to the grate portion 56 may be beneficial in circumstances where a user finds it desirable to be able to withdraw or retract the blade elements 66 of the counter blade assembly 48 from the flow passage or passageway 62, such as to clear obstructions/foreign objects as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of blade bank 64 in the embodiment of FIGS. 3 and 4 is shown as being controlled by the operation of a lever assembly 92 and associated linkages, various other mechanisms and devices could equally as well be utilized to control the positioning of positioning rods 90, 91 or, more directly, the swivel positioning of bank support member 81, or even the placement of blade bank 64 closer or farther from grate portion 56. Such mechanisms and devices may be manually or automatically operable, including remotely by a user, such as from the cab of a combine, and may include various and sundry systems and components of well-known construction for effecting the desired movements, placements, or positioning.

For example, as shown in FIG. 4, an actuating mechanism such as a solenoid 71 can be operatively connected to the lever assembly 92, such as by being connected to the lever 93. In one embodiment, the solenoid 71 may receive a signal i.e., an input, from a controller 73, such as through solenoid wires 75. In another embodiment, the signal between the solenoid 71 and the controller 73 may be conveyed via a wireless arrangement. Alternatively, the lever can be adjusted by other actuating mechanisms such as an electrical and/or mechanical actuator, hydraulic cylinder, a linear actuator, a pneumatic actuator, a motor or the like.

In another embodiment, the solenoid 71 may be connected to the blade bank 64 anywhere along its structure so as to move the blade bank 64 from a fully engaged or extended position to at least a partially retracted position. That is, the solenoid 71 may move the blade bank 64 between a first position (e.g., the blade bank 64 is fully retracted from the chopper grate assembly 44) and a second position (e.g., the blade bank 64 is fully engaged with the chopper grate assembly 44).

In several embodiments, the counter blade assembly 48 may also include a blade reset assembly (shown schematically in FIG. 4 as dashed box 100, 200). As will be described below, the blade reset assembly 100, 200 may include suitable components for pivotally coupling individual blade elements 66 or groups of blade elements 66 to the bank support member 81. As such, when a given blade element(s) 66 is contacted by a foreign object (e.g., a rock) when the blade bank 64 is located at its extended position, the blade element(s) 66 or a group of blade elements 66 including such blade element 66 may be allowed to independently pivot relative to the grate assembly 44 toward its retracted position to prevent damage to the blade element(s) 66.

FIG. 6 shows one exemplary knife blade arrangement 61 in which a plurality, such as twenty-one (21) generally ring-like portions 63 are axially stacked side-by-side along the longitudinal axis 65 of the rotary member 50. Mounts or mounting lugs 67, sometimes hereinafter referred to as lugs, are affixed, such as by welding, to the outer periphery 69 of the rotary member 50 at spaced annular intervals that are generally equal to one another.

From previous discussions hereinabove, it should be appreciated that, when the counter blade assembly 48 is at an engaged or extended position, with the blade elements 66 thereof projecting between the slots 60 of the grate portion 56 of the chopper grate assembly 44, with the rotary member 50 being rotated at about 3,000 RPM, the knife blades 52 on the rotary member 50 can serve to transport residue rapidly towards the rear of combine 10 and, while doing so, can also interact with the blade elements 66 of the counter knife assembly 48 to chop or cut the residue into smaller pieces. Alternatively, especially if the counter blade assembly 48 is positioned in its retracted position, with the blade elements 66 being retracted within the slots 60 of the grate portion 56 of the chopper grate assembly 44, with the rotary member 50 being rotated at a lesser rate of about 800 RPM, the knife blades 52 on the rotary member 50 may serve to transport residue contacted thereby towards the rear of combine 20, but more slowly and with less damage to the crop residue, as a consequence of which longer and larger pieces of residue will be transported rearward in combine 20.

Figure 7:
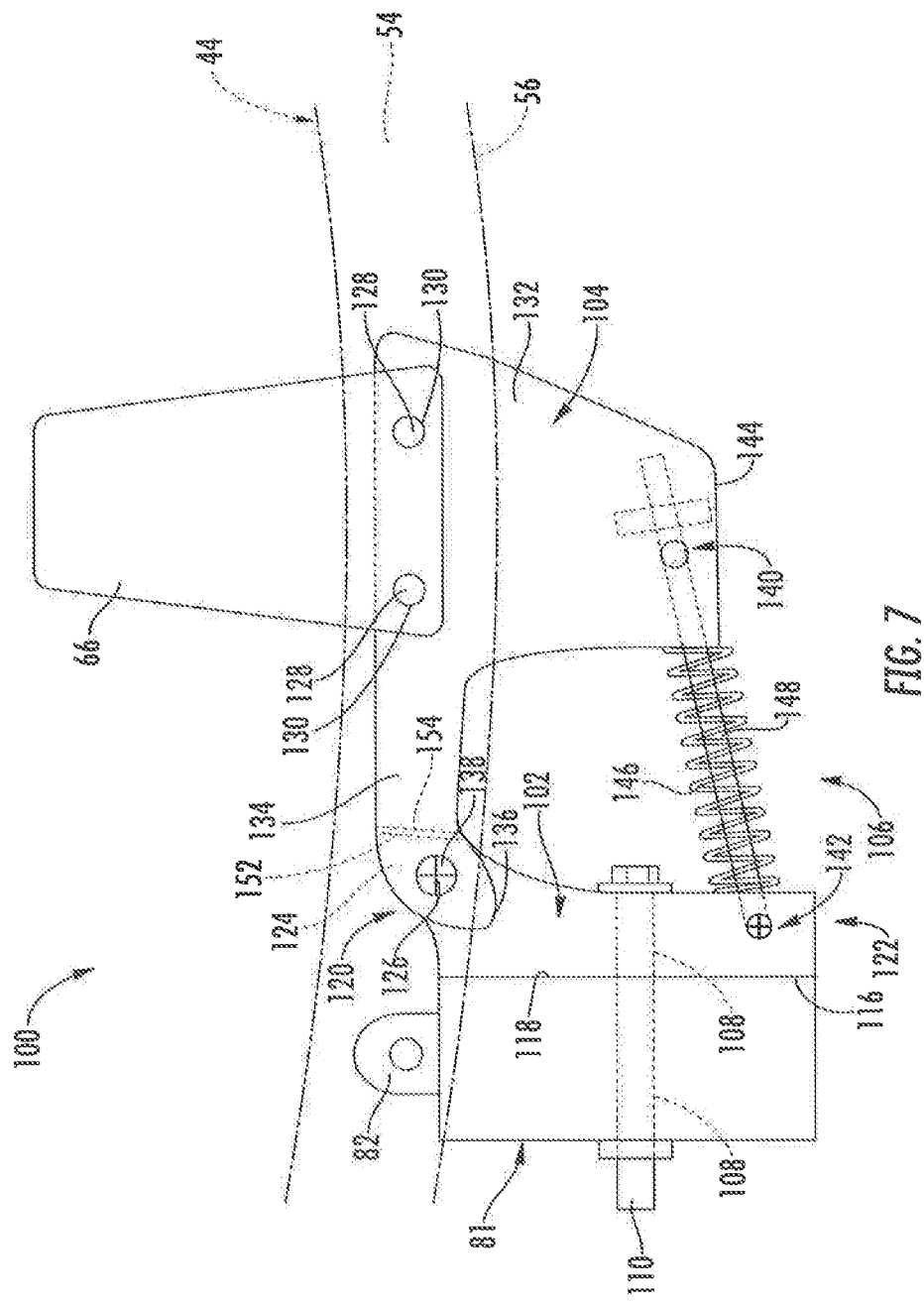
FIG. 7 illustrates a simplified, side view of one embodiment of a blade reset assembly suitable for use within an integral chopper assembly of a combine in accordance with aspects of the present subject matter, particularly illustrating the blade reset assembly with blade elements located at an extended position relative to an adjacent grate assembly.
Figure 8:
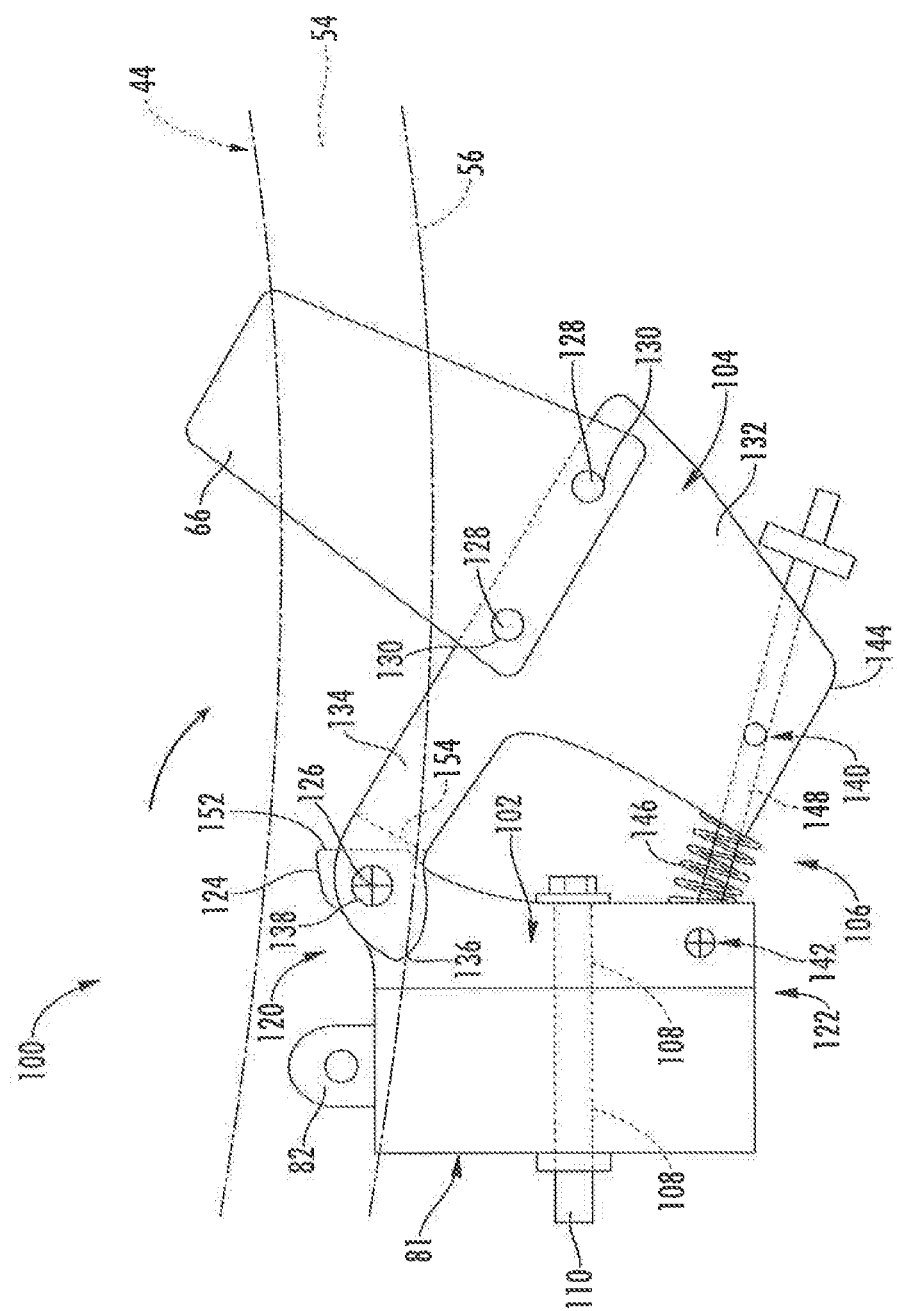
FIG. 8 illustrates another simplified, side view of the blade reset assembly shown in FIG. 7, particularly illustrating the blade elements pivoted downward relative to the adjacent grate assembly to a retracted position.
Figure 9:
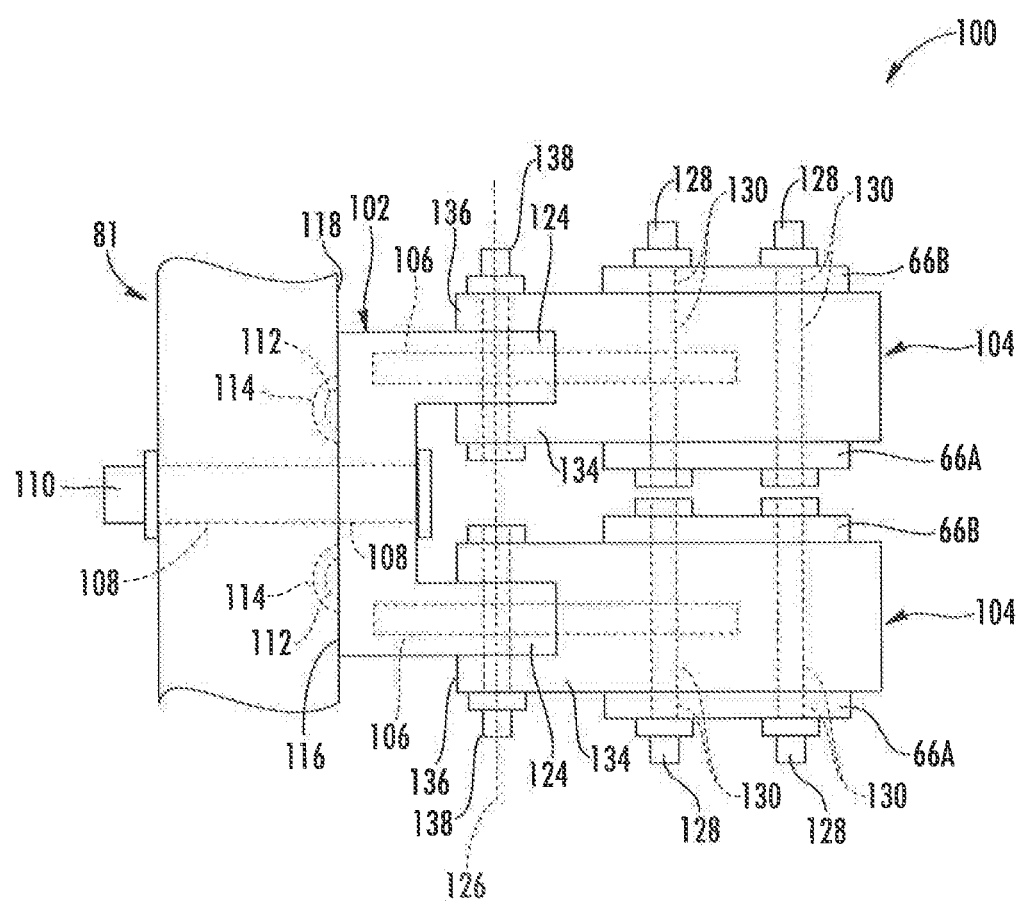
FIG. 9 illustrates a top view of the blade reset assembly shown in FIG. 7.

Referring now to FIGS. 7-9, one embodiment of a blade reset assembly 100 for pivotally coupling one or more blade elements 66 of the blade bank 64 to the bank support member 81 is illustrated in accordance with aspects of the present subject matter. Specifically, FIGS. 7 and 8 illustrate schematic, side views of the blade reset assembly 100, with FIG. 7 showing the supported blade elements 66 located at their extended position and FIG. 8 showing the supported blade elements 66 pivoted downward to a partially or fully retracted position. Additionally, FIG. 9 illustrates a top view of the blade reset assembly 100 shown in FIG. 7.

As shown in the illustrated embodiment, the blade reset assembly 100 may include a pivot support member 102, a blade support body 104 pivotally coupled to the pivot support member 102 and configured to support one or more blade elements 66, and a blade reset mechanism 106 coupled between the pivot support member 102 and the blade support body 104 for applying a biasing or reset force against the blade support body 104 that biases the body 104 (and the blade elements) 66 supported thereon) towards the extended position (e.g., the position shown in FIG. 7). As will be described below, the blade reset mechanism 104 may also be configured to allow the blade support body 104 to pivot relative to the pivot support member 102 against the biasing or reset force when a given force is applied to the supported blade element(s) 66, thereby permitting the blade element(s) 66 to be moved to a partially or fully retracted position. As such, when a foreign object (e.g., a rock) contacts the blade element(s) 66 coupled to the blade support body 104, the blade element(s) 66 may at least partially retract relative to the grate assembly 44 to allow the foreign object to pass through the passageway 62 defined between the grate assembly 44 and the rotary chopper element 42. Once the foreign object has passed by the blade element(s) 55, the biasing or reset force applied by the blade reset mechanism 106 may serve to urge the blade support body 104 to pivot relative to the pivot support member 102 back towards the grate assembly 44, thereby moving the blade element(s) 66 back to its extended position.

It should be appreciated that, depending on the configuration of the various components of the blade reset assembly 100, the disclosed assembly 100 may include any number of pivot support members 102, blade support bodies 104, and/or blade reset mechanisms 106 configured to be installed relative to the bank support member 81 between the end plates 78, 80 of the blade bank 64. For instance, in the illustrated embodiment, each pivot support member 102 is configured to be coupled to two blade support bodies 104, with each blade support body 104, in turn, being configured to support two blade elements 66 of the plurality blade elements 66 forming the blade bank 64. In such an embodiment, the number of pivot support members 102 and associated blade support bodies 104 may be selected based on the desired number of blade elements 66 such that the various blade elements 66 are supported relative to the grate assembly 44 between the blade bank end plates 78, 80. In other embodiments, each pivot support member 102 may be configured to be coupled to a single blade support body 104 or three or more blade support bodies 104. Similarly, in alternative embodiments, each blade support body 104 may be configured to support a single blade element 66 or three or more blade elements 66 of the blade bank 64.

As shown, the pivot support member 102 may generally correspond to a mounting plate configured to be fixedly or non-rotatably coupled to the bank support member 81 of the counter blade assembly 48. For example, in one embodiment, the pivot support member 102 and the bank support member 81 may define one or more pairs of aligned mounting holes 108 configured to receive a corresponding fastener 110 (e.g., a bolt(s)) for coupling the pivot support member 102 to the bank support member 81. Additionally, in one embodiment, the pivot support member 102 and/or the bank support member 81 may include one or more alignment features for aligning the pivot support member 102 relative to the bank support member 81. For instance, as particularly shown in FIG. 9, the pivot support member 102 may include one or more alignment tabs or protrusions 112 extending outwardly from a first face 116 of the pivot support member 102 that are configured to be received within one or more corresponding alignment recesses 114 defined in an adjacent face 118 of the bank support member 81. In such an embodiment, when installing the pivot support member 102 on the bank support member 81, the pivot support member 102 may be aligned relative to the bank support member 81 such that each alignment tab(s) 112 is received within an associated recess 114, thereby ensuring proper relative orientation between the assembled components. Additionally, in one embodiment, the engagement between the alignment tab(s) 112 and the associated recess(es) 114 may prevent relative rotation between the assembled components, which may be desirable when the pivot support member 102 is configured to otherwise be coupled to the bank support member 81 via a single fastener 110.

It should be appreciated that, although the alignment tabs 112 were described above as being included on the pivot support member 102, the alignment configuration may be reversed, with the alignment tabs 112 extending outwardly from the adjacent face 118 of the bank support member 81. In such an alternative embodiment, the pivot support member 102 may be configured to define one or more corresponding recesses 114 for receiving the alignment tab(s) 112 of the bank support member 81 at the interface defined between the components.

As shown in FIG. 7, when the pivot support member 102 is coupled to the bank support member 81, the pivot support member 102 may generally extend vertically between a first end 120 and a second end 122, with the first end 120 being positioned generally adjacent to a portion of the grate assembly 44 and the second end 122 being positioned further away from the grate assembly 44. In one embodiment, a portion of the pivot support member 102 may define a pivot head(s) 124 at or adjacent to the first end 120 of the pivot support member 102. As will be described below, each blade support body 104 may be configured to be coupled to the pivot support member 102 at a corresponding pivot head 124 such that a pivot axis 126 is defined between the blade support body 104 and the pivot support member 104 at or adjacent to the first end 120 of the pivot support member 102. As shown in FIG. 9, in the illustrated embodiment, the pivot support member 102 includes two pivot heads 124 for coupling two separate blade support bodies 104 thereto. Additionally, as will be described below, a portion of the pivot support member 102 located at or adjacent to its second end 122 may define a mounting location 142 for pivotally coupling the blade reset mechanism 106 to the pivot support member 102.

In general, each blade support body 104 is configured to directly support one or more blade elements 66 of the blank bank 64 relative to the grate assembly 44. For example, as particularly shown in the top view of FIG. 9, each blade support body 104 may configured to support two blade elements 66, such as first and second blade elements 66A, 66B, in a side-to-side arrangement along each side of the blade support body 104. In such an embodiment, suitable fasteners 128 may be inserted through aligned mounting holes 130 defined in the blade support body 104 and each blade element 66 for rigidly coupling the blade elements 66 to the support body 104. As indicated above, in alternative embodiments, the blade support body 104 may be configured to support any other suitable number of blade elements 66, such as a single blade element or three or more blade elements.

As particularly shown in FIGS. 7 and 8, in one embodiment, each blade support body 104 may include a base portion 132 to which the blade elements 66 are configured to be coupled and a pivot arm 134 extending outwardly from the base portion 132 in the direction of the pivot support member 102 for pivotally coupling the blade support body 104 to the pivot support member 102. In such an embodiment, the pivot arm 134 of the blade support body 104 may have any suitable configuration that allows it to be pivotally coupled to a corresponding pivot head 124 of the pivot support member 102 via any suitable means. For instance, as shown in FIG. 9, the pivot arm 134 may extend to a pivot end 136 defining a clevis for receiving the associated pivot head 124 of the pivot support member 102. In such an embodiment, a suitable pivot member 138, such as a pivot pin (e.g., cotton pin or a roll pin), a bolt or other suitable fastener, may be inserted through aligned openings (not shown) in both the pivot head 124 and the pivot arm 134 to pivotally couple the blade support body 104 to the pivot support member 102, thereby defining a pivot axis 126 directly between such components. It should be appreciated that, as an alternative to the illustrated configuration, the pivot joint defined between the blade support body 104 and the pivot support member 102 may be formed in any other suitable manner, such as by configuring each pivot head 124 of the pivot support member 102 to define a clevis for receiving the corresponding pivot end 136 of the pivot arm 134.

By providing a pivotal connection between each blade support body 104 and the adjacent pivot support member 102, each blade support body 104 may be configured to pivot about the pivot axis 126 relative to both the pivot support member 102 and the adjacent grate assembly 44, thereby allowing the blade elements 66 supported thereon to be moved relative to the grate assembly 44 between the extended and retracted positions. For example, as shown in FIG. 7, when the blade support body 104 is at its normal position relative to the pivot support member 102, the blade elements 66 may be located at the extended position such that each blade element 66 extends through the grate assembly 44 and projects into the passageway 62 defined between the grate assembly 44 and the rotary chopper element 42. Similarly, as shown in FIG. 8, when the blade support body 104 is pivoted away from its normal position (e.g., in the clock-wise direction in the view shown in FIG. 8) the blade elements 66 may be moved downwardly relative to the grate assembly 44 such that each blade element 66 is at least partially retracted relative to the passageway 62, In one embodiment, the pivot support member 102 and/or the blade support body 104 may include one or more stop features configured to contact a corresponding feature of the adjacent component when the blade elements 66 are pivoted upwardly towards that grate assembly 44 to the fully extended position (e.g., as shown in FIG. 7), thereby preventing further pivoting of the blade support body 104 in such direction. For example, as shown in FIGS. 7 and 8, in one embodiment, the pivot head 124 of the pivot support member 102 may define an end or stop surface 152 configured to contact or otherwise be engaged against a corresponding stop surface 154 of the pivot arm 134 of the blade support body 102 when the blade elements 66 are pivoted to the fully extended position. As such, engagement between the stop surfaces 154, 156 may prevent further pivoting of the blade support body 104 relative to the pivot support member 102.

Additionally, as indicated above, the blade reset assembly 100 may also include a blade reset mechanism 106 configured to apply a biasing or reset force against an associated blade support body 104 that urges the blade support body 104 to pivot about the pivot axis 126 in the direction of the adjacent grate assembly 44, thereby biasing the associated blade elements 66 to their normal, extended position. In such instance, the biasing force applied by the blade reset mechanism 106 may be selected so as to maintain the blade elements 66 at the extended position during normal operation while still allowing the blade support body 104 to pivot downwardly away from the grate assembly 44 against the biasing force when a given or predetermined counterforce is applied against the blade elements 66 (e.g., due to contact with a foreign object), thereby allowing the blade elements 66 to pivot towards the retracted position.

As shown in FIGS. 7 and 8, in one embodiment, the blade reset mechanism 106 may be configured to be coupled directly between the pivot support member 102 and the blade support body 104. For example, the blade reset mechanism 106 may be configured to be coupled to the blade support body 104 at a first mounting location 140 and to the pivot support member 102 at a second mounting location 142. As shown in FIGS. 7 and 8, in one embodiment, the first mounting location 140 may be defined on the base portion 132 of the blade support body 104 (e.g., at a location adjacent to a bottom end 144 of the base portion 132 of the support body 104) while the second mounting location 142 may be defined at a location adjacent to the second end 122 of the pivot support member 102.

In one embodiment, the positioning of the pivot axis 126 relative to one or both of the mounting locations 140, 142 and/or the relative positioning of the mounting locations 140, 142 may be selected, as desired, to tailor the operation and/or performance of the disclosed blade reset assembly 100. For instance, in the illustrated embodiment, the blade reset assembly 100 has a top pivot, bottom reset configuration such that the pivot axis 126 defined between the pivot support member 102 and the blade support body 104 is positioned closer to the grate assembly 44 (e.g., the grate portion 56 of the assembly 44) than both the first mounting location 140 and the second mounting location 142. However, as will be described below with reference to FIGS. 11 and 12, in other embodiments, the disclosed blade reset assembly 100 may have a bottom pivot, top reset configuration. Additionally, as shown in FIG. 7, with the blade elements 66 located at their extended position, the first mounting location 140 for the blade reset mechanism 106 is located closer to the grate assembly 44 (e.g., the grate portion 56 of the assembly 44) than the second mounting location 142 such that the blade reset mechanism 106 is angled upwardly in the direction of the grate assembly 44 from the pivot support member 102 to the blade support body 104.

It should be appreciated that, in several embodiments, a separate blade reset mechanism 106 may be provided in operative association with each blade support body 104, thereby allowing each individual support body 104 to be capable of independently pivoting relative to the grate assembly 44. For instance, as shown in FIG. 9, a separate blade reset mechanism (indicated by the dashed lines 106) is provided between each blade support body 104 and the associated pivot support member 102. Alternatively, each blade reset mechanism 106 may be coupled to two or more blade support bodies 104.

In several embodiments, the blade reset mechanism 106 may correspond to a passive, spring-loaded mechanism. Specifically, as shown in FIGS. 7 and 8, the blade reset mechanism 106 may, in one embodiment, correspond to a spring-rod assembly including a spring 146 configured to be compressed between the pivot support member 102 and the blade support body 104 and a rod 148 extending through the spring 146 between the first and second mounting locations 140, 142. In such an embodiment, opposed portions of the rod 148 may be coupled to the blade support body 104 and the pivot support member 102 at the first and second mounting locations 140, 142, respectively, to secure the blade reset mechanism 106 between such components. For instance, as shown in FIG. 7, one end of the rod 148 may be pivotally coupled to the pivot support member 102 at the second mounting location 142 to allow the blade reset mechanism 106 to pivot relative to the pivot support member 102 with corresponding pivotal motion of the blade support body 104. Additionally, in one embodiment, an opposed portion of the rod 148 may be configured to be slidably coupled to the blade support body 104 at the first mounting location 142 to allow the length of the rod 148 extending between the first and second mounting locations 140, 142 to adjust as the blade support body 104 pivots relative to the pivot support member 102.

It should be appreciated that, in other embodiments, the blade reset mechanism 106 may correspond to any other suitable passive device that allows the reset mechanism 106 to function as described herein. For instance, the blade reset mechanism 106 may correspond to a torsion axle, a torsion spring, a compressed gas spring, and/or any other suitable passive device. It should also be appreciated that, when utilizing a passive device, the blade reset mechanism 106 may also include suitable features and/or components for adjusting the biasing force applied by such mechanism 106, thereby allowing the operator to set or adjust the force required to cause the blade elements 66 to pivot downwardly towards their retraction position. For instance, the illustrated embodiment, a nut or other suitable component may be provided in operative association with the rod 148 for adjusting the maximum compression length of the spring 146 between the first and second mounting locations 140, 142, thereby allowing the associated biasing force of the spring 146 to be adjusted as desired.

Figure 10:
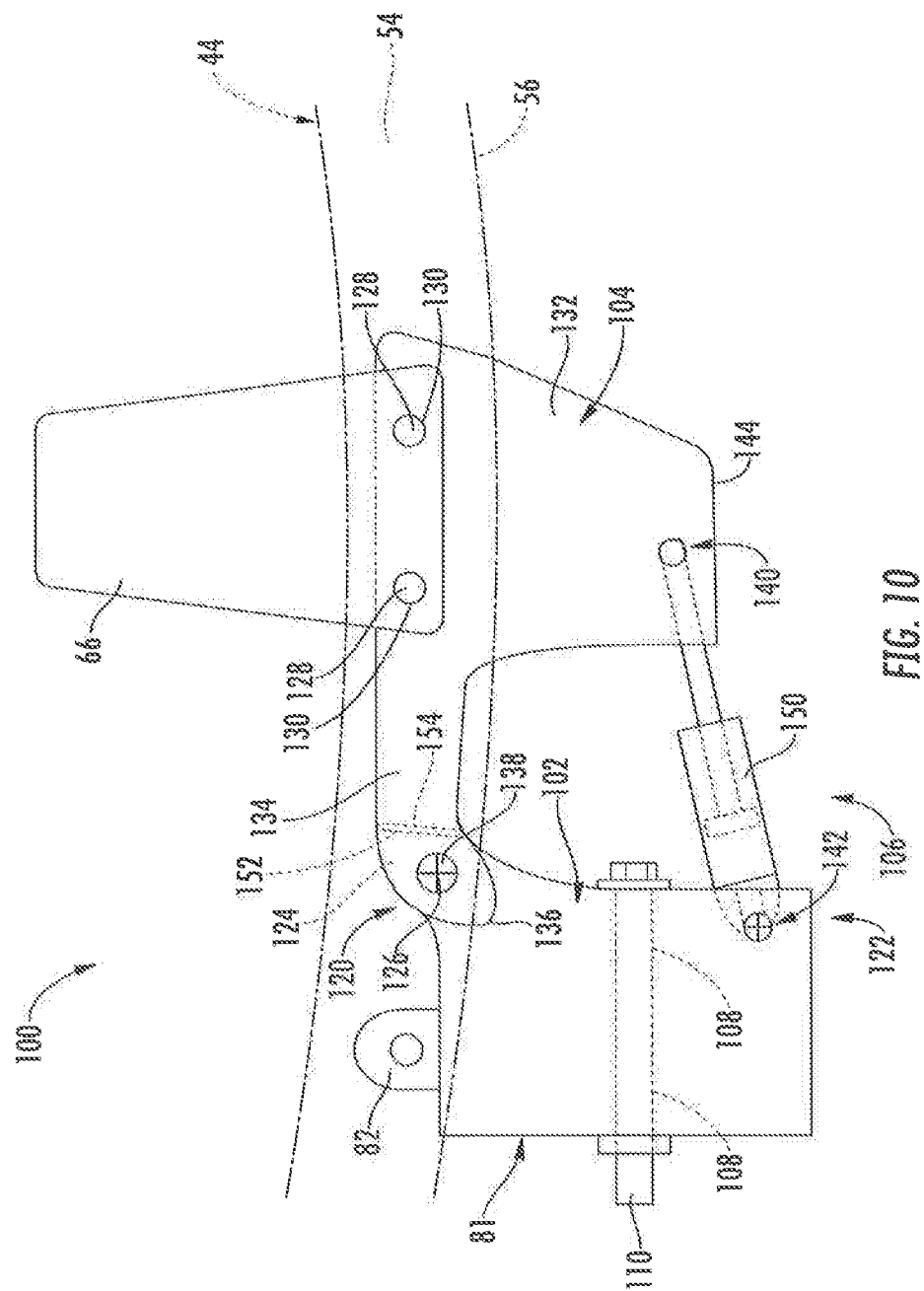
FIG. 10 illustrates a simplified, side view of an alternative embodiment of the blade reset assembly shown in FIG. 7, particularly illustrating the assembly including an active-force device.

As an alternative to passive devices, the blade reset mechanism 106 may correspond to an actively controlled device. For instance, the blade reset mechanism 106 may correspond to a hydraulic cylinder, a pneumatic cylinder, an electric actuator, and/or any other suitable active-force device. An example of such an active-force device used in connection with the embodiment of the blade reset assembly 100 shown in FIGS. 7-9 is illustrated in FIG. 10. As shown, the blade reset mechanism 106 corresponds to an actively controlled linear actuator 150 (e.g., a pneumatic or hydraulic cylinder or a solenoid-activated actuator). In such an embodiment, the operation of the blade reset mechanism 106 may be electronically controlled (e.g., via an associated controller or computing device) to allow the biasing force applied by the mechanism 106 to be set and/or adjusted by the operator, as desired.

Figure 11:
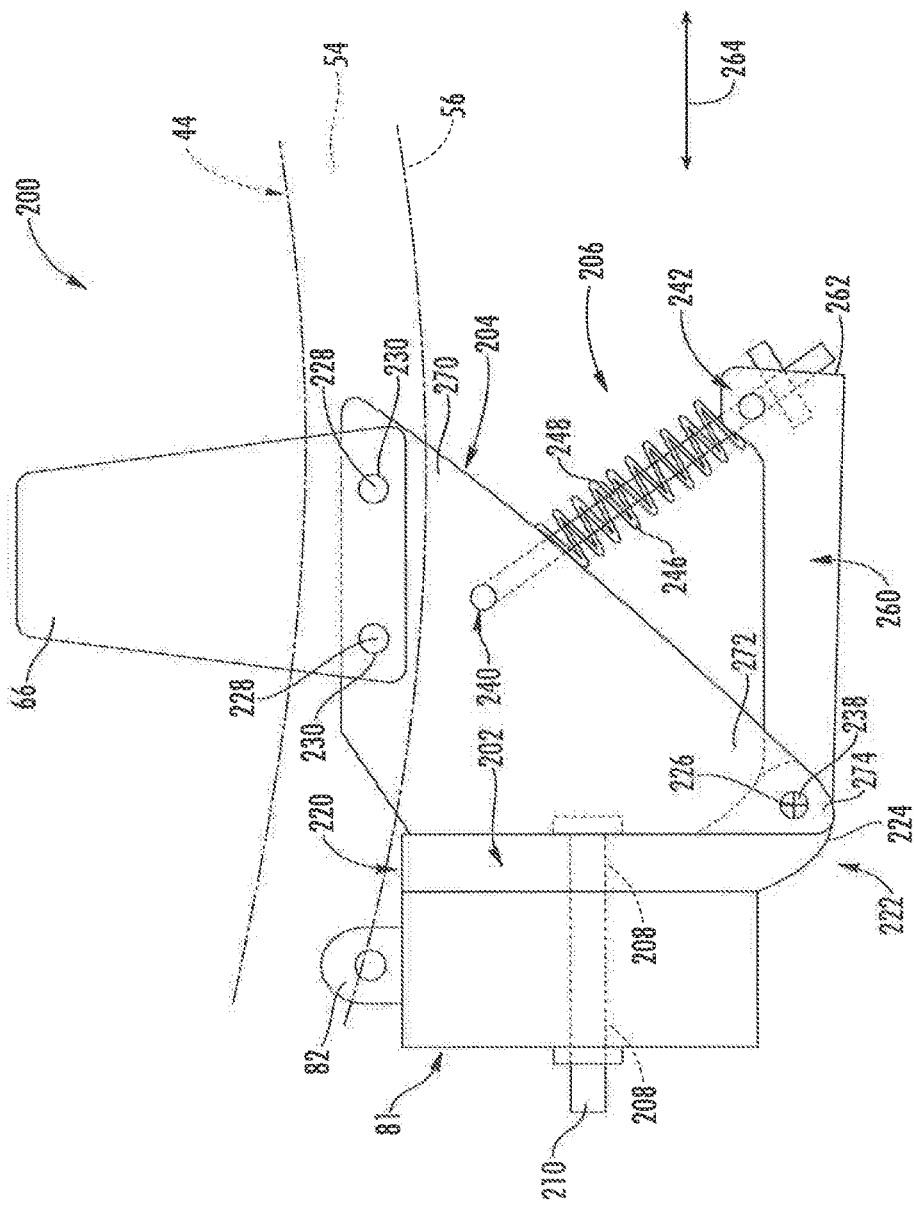
FIG. 11 illustrates a simplified, side view of yet another embodiment of a blade reset assembly suitable for use within an integral chopper assembly of a combine in accordance with aspects of the present subject matter, particularly illustrating the blade reset assembly with blade elements located at an extended position relative to an adjacent grate assembly.
Figure 12:
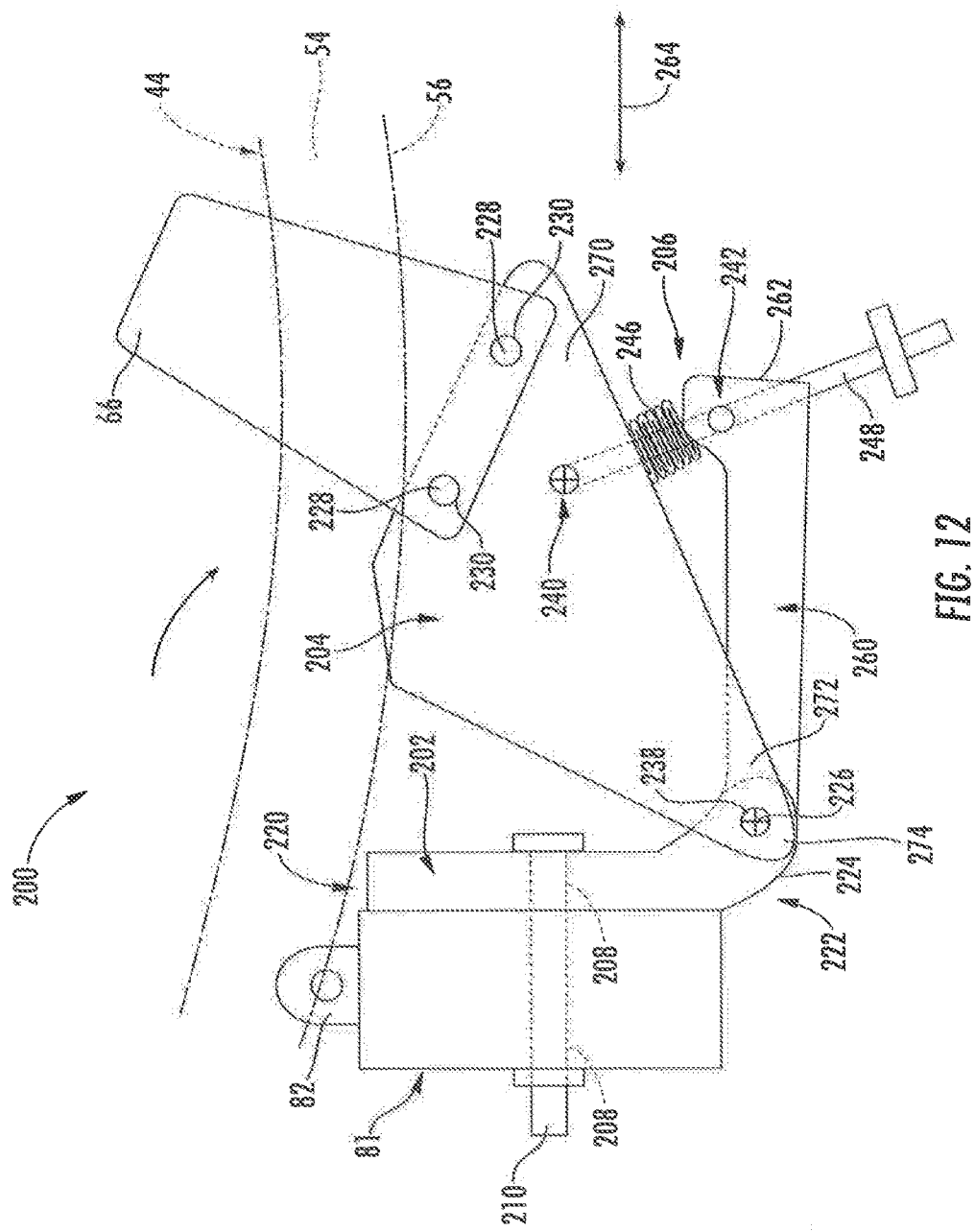
FIG. 12 illustrates another simplified, side view of the blade reset assembly shown in FIG. 11, particularly illustrating the blade elements pivoted downward relative to the adjacent grate assembly to a retracted position.

Referring now to FIGS. 11 and 12, another embodiment of a blade reset assembly 200 for pivotally coupling one or more blade elements 66 of the blade bank 64 to the bank support member 81 is illustrated in accordance with aspects of the present subject matter. Specifically, FIGS. 11 and 12 illustrate schematic, side views of the blade reset assembly 200, with FIG. 11 showing the supported blade elements 66 located at their extended position and FIG. 12 showing the supported blade elements 66 pivoted downward to a partially or fully retracted position.

In general, the blade reset assembly 200 may be configured similar to the blade reset assembly 100 described above with reference to FIGS. 7-9. For instance, the blade reset assembly 200 may include a pivot support member 202, a blade support body 204 pivotally coupled to the pivot support member 202 and configured to support one or more blade elements 66, and a blade reset mechanism 206 coupled between the pivot support member 202 and the blade support body 204 for applying a biasing or reset force against the blade support body 204 for biasing the body 204 (and the blade element(s) 666 supported thereon) towards the extended position (e.g., the position shown in FIG. 11). Additionally, the blade reset mechanism 206 may also be configured to allow the blade support body 204 to pivot relative to the pivot support member 202 against the biasing or reset force when a given force is applied to the supported blade element(s) 66, thereby permitting the blade element(s) 66 to be moved to a partially or fully retracted position. As such, when a foreign object (e.g., a rock) contacts the blade element(s) 66 coupled to the blade support body 204, the blade element(s) 66 may at least partially retract relative to the grate assembly 44 to allow the foreign object to pass through the passageway 62 defined between the grate assembly 44 and the rotary chopper element 42. Once the foreign object has passed by the blade element(s) 66, the biasing or reset force applied by the blade reset mechanism 206 may serve to urge the blade support body 204 to pivot relative to the pivot support member 202. back towards the grate assembly 44, thereby moving the blade element(s) 66 back to its extended position.

It should be appreciated that, similar to the embodiment described above, the disclosed assembly 200 may include any number of pivot support members 202, blade support bodies 204, and/or blade reset mechanisms 206 configured to be installed relative to the bank support member 81 between the blade bank end plates 78, 80. For instance, in one embodiment, each pivot support member 202 may be configured to be coupled to two blade support bodies 204, with each blade support body 204, in turn, being configured to support two blade elements 66 of the plurality blade elements 66 forming the blade bank 64. In such an embodiment, the number of pivot support members 202 and associated blade support bodies 204 may be selected based on the desired number of blade elements 66 such that the various blade elements 66 are supported relative to the grate assembly 44 between the blade bank end plates 78, 80. In other embodiments, the pivot support member 202 may be configured to be coupled to a single blade support body or three or more blade support bodies. Similarly, in alternative embodiments, each blade support body 204 may be configured to support a single blade element or three or more blade elements of the blade bank 64.

As shown, similar to the embodiment described above, the pivot support member 202 may generally correspond to a mounting plate configured to be fixedly or non-rotatably coupled to the bank support member 81 of the counter blade assembly 48. For example, in one embodiment, the pivot support member 202 and the bank support member 81 may define one or more pairs of aligned mounting holes 208 configured to receive a corresponding fastener (e.g., a bolt(s)) for coupling the pivot support member 202 to the bank support member 81. Additionally, in one embodiment, the pivot support member 202 and/or the bank support member 81 may include one or more alignment features (not shown) for aligning the pivot support member 202 relative to the bank support member 81 during the assembly process.

As shown in FIG. 11, when the pivot support member 202 is coupled to the bank support member 81, the pivot support member 202 may generally extend vertically between a first end 220 and a second end 222, with the first end 220 being positioned generally adjacent to a portion of the grate assembly 44 and the second end 222 being positioned further away from the grate assembly 44. In one embodiment, a portion of the pivot support member 202 may define a pivot head(s) 224 at or adjacent to the second end 222 of the pivot support member 202. As will be described below, each blade support body 204 may be configured to be coupled to its associated pivot support member 202 at a corresponding pivot head 224 such that a pivot axis 226 is defined between the blade support body 204 and the pivot support member 202 at or adjacent to the second end 222 of the pivot support member 202. Similar to the embodiment described above, in the event that the pivot support member 202 is configured to be coupled to two or more separate blade support bodies 204, the pivot support member 202 may include a corresponding number of pivot heads 204 at or adjacent to its second end 222.

Additionally, as shown in FIGS. 11 and 12, in one embodiment, the pivot support member 202 may also include a fixed support arm 260 extending outwardly relative to the bank support member 81 such that a support end 262 of the arm 260 is spaced apart in a lateral direction (e.g., indicated by arrow 264 in FIGS. 11 and 12) from the pivot axis 226 along a side of the pivot support member 202 opposite the bank support member 81. As will be described below, the fixed support arm 262 may define a mounting location 242 at or adjacent to its support end 262 for coupling the blade reset mechanism 206 to the support arm 262.

As indicated above, in one embodiment, the fixed support arm 260 may correspond to a component of the pivot support member 202, such as by being formed integrally with the pivot support member 202 or by being fixedly or non-rotatably coupled to the pivot support member 202. Alternatively, the fixed support arm 260 may correspond to a separate component from the pivot support member 202. In such an embodiment, the fixed support arm 260 may, for example, be configured to be separately coupled to the bank support member 81 and/or any other suitable component that allows the support arm 260 to function as described herein.

As indicated above, the blade support body 204 may generally be configured to directly support one or more blade elements 66 of the blank bank 64 relative to the grate assembly 44, such as by supporting two blade elements 66 in a side-to-side arrangement along each side of the blade support body 204. As shown in FIGS. 11 and 12, in one embodiment, suitable fasteners 228 may be inserted through aligned mounting holes 230 defined in the blade support body 204 and each blade element 66 for rigidly coupling the blade elements 66 to the support body 204.

As particularly shown in FIGS. 11 and 12, in one embodiment, the blade support body 204 may generally be configured to extend vertically between an upper portion 270 and a lower portion 272, with the blade elements 66 configured to be coupled to the upper portion 270 of the blade support body 204 and the pivot support member 202 configured to be pivotally coupled to the lower portion 272 of the blade support body 204. In such an embodiment, the lower portion 272 of the blade support body 204 may have any suitable configuration that allows it to be pivotally coupled to the corresponding pivot head 224 of the pivot support member 202. For instance, in one embodiment, the lower portion 272 of the blade support body 204 may define a clevis 274 for receiving the associated pivot head 224 of the pivot support member 202 or vice versa. In such an embodiment, a suitable pivot member 238, such as a pivot pin (e.g., cotton pin or a roll pin), a bolt or any other suitable fastener, may be inserted through aligned openings (not shown) in both the pivot head 224 and the lower portion 272 of the blade support body 204 to pivotally couple the blade support body 204 to the pivot support member 202, thereby defining a pivot axis 226 directly between such components.

Similar to the embodiment described above, by providing a pivotal. connection between each blade support body 204 and the adjacent pivot support member 202, each blade support body 204 may be configured to pivot about the pivot axis 226 relative to both the pivot support member 202 and the adjacent grate assembly 44, thereby allowing the blade elements 66 supported thereon to be moved relative to the grate assembly 44 between the extended and retracted positions. For example, as shown in FIG. 11, when the blade support body 204 is at its normal position relative to the pivot support member 202, the blade elements 66 may be located at the extended position such that each blade element 66 extends through a portion of the grate assembly 44 and projects into the passageway 62 defined between the grate assembly 44 and the rotary chopper element 42. Similarly, as shown in FIG. 12, when the blade support body 204 is pivoted away from its normal position (e.g., in the clockwise direction in the view shown in FIG. 12), the blade elements 66 may be moved downwardly relative to the grate assembly 44 such that each blade element 66 is at least partially retracted relative to the passageway 62.

Additionally, as indicated above, the blade reset assembly 200 may also include a blade reset mechanism 206 configured to apply a biasing or reset force against the blade support body 204 that urges the blade support body 204 to pivot about the pivot axis 226 in the direction of the adjacent grate assembly 44, thereby biasing the associated blade elements 66 to their normal, extended position. In such instance, the biasing force applied by the blade reset mechanism 206 may be selected so as to maintain the blade elements 66 at the extended position during normal operation while still allowing the blade support body 204 to pivot downwardly away from the grate assembly 44 against the biasing force when a given or predetermined counterforce is applied against the blade elements 66 (e.g., due to contact with a foreign object), thereby allowing the blade elements 66 to pivot towards the retracted position.

As shown in FIGS. 11 and 12, in one embodiment, the blade reset mechanism 206 may be configured to be coupled directly between the fixed support arm 260 and the blade support body 204. For example, the blade reset mechanism 206 may be configured to be coupled to the blade support body 204 at a first mounting location 240 and to the fixed support arm 260 at a second mounting location 242. As shown in FIGS. 11 and 12, in one embodiment, the first mounting location 240 may be defined on the blade support body 204 at a location along the body 204 between the pivot axis 226 and the mounting location of the blade elements 66 while the second mounting location 242 may be defined at a location adjacent to the support end 262 of the fixed support arm 260.

In one embodiment, the positioning of the pivot axis 226 relative to one or both of the mounting locations 240, 242 and/or the relative positioning of the mounting locations 240, 242 may be selected, as desired, to tailor the operation and/or performance of the disclosed reset assembly 200. For instance, in the illustrated embodiment, the blade reset assembly 200 has a bottom pivot, top reset configuration such that the pivot axis 226 defined between the pivot support member 202 and the blade support body 204 is positioned further from the grate assembly 44 (e.g., the grate portion 56 of the assembly 44) than the first mounting location 240 when the blade elements 66 are located at the extended position. Additionally, as shown in FIG. 11, the pivot axis 226 may, optionally, be located further from the grate assembly 44 than the second mounting location 242. However, in other embodiments, the second mounting location 242 may be defined at a location further away from the grate assembly than the pivot axis 226, such as by configuring the fixed support arm 260 to be angled slightly downwardly relative to the pivot axis 226. Moreover, as shown in FIG. 11, the second mounting location 242 for the blade reset mechanism 206 is located further away from both the grate assembly 44 and the bank support member 81 than the first mounting location 240 such that the blade reset mechanism 206 extends from the second mounting location 242 at an angled orientation when the blade elements 66 are at the extended position that includes a lateral component extending in the direction of the pivot point 226 and a vertical component extending in the direction of the grate assembly 44.

It should be appreciated that, with the bottom pivot, top reset configuration shown in FIGS. 11 and 12, a larger moment arm may be defined between the blade elements 66 and the pivot axis 262 for the blade support body 204 than with the top pivot, bottom reset configuration shown in FIGS. 7-10. As a result, this larger moment arm may facilitate enhanced pivoting of the disclosed assembly 200 relative to the grate assembly 44, particular when one of the blade elements 66 is contacted by a foreign object at a location adjacent to the grate portion 56 or surface of the concave pan.

It should also be appreciated that, similar to the embodiment described above, a separate blade reset mechanism 206 may be provided in operative association with each blade support body 204, thereby allowing each individual support body 204 to be capable of independently pivoting relative to the grate assembly 44. Alternatively, each blade reset mechanism 206 may be coupled to two or more blade support bodies 204.

Additionally, similar to the embodiment described above, the blade reset mechanism 206 may generally correspond to any suitable device that allows the mechanism to function as described herein. For instance, as shown in FIGS. 11 and 12, the blade reset mechanism 206 may, in one embodiment, correspond to a spring-rod assembly including a spring 246 configured to be compressed between the pivot support member 202 (e.g., via the fixed support arm 260) and the blade support body 204 and a rod 248 extending through the spring 246 between the first and second mounting locations 240, 242. In such an embodiment, one end of the rod 248 may, for example, be pivotally coupled to the blade support body 204 at the first mounting location 242 to allow the blade reset mechanism 206 to pivot relative to the blade support body 204. Additionally, in one embodiment, an opposed portion of the rod 248 may be configured to be slidably coupled to the fixed support arm 260 at the second mounting location 242 to allow the length of the rod 248 extending between the first and second mounting locations 240, 242 to adjust as the blade support body 204 pivots relative to the pivot support member 202. Alternatively, the blade reset mechanism 206 may correspond to any other suitable passive device, such as a torsion axle, a torsion spring, a compressed gas spring, and/or the like. In other embodiments, the blade reset mechanism 206 may correspond to an actively controlled device, such as a hydraulic cylinder, a pneumatic cylinder, an electric actuator, and/or any other suitable active-force device. For instance, in one embodiment, the blade reset mechanism 206 may correspond to a similar linear actuator 150 as that shown in FIG. 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A chopper assembly for a harvester, the chopper assembly comprising:
   a rotary chopper element;
   a chopper grate assembly spaced apart from the rotary chopper element to form a passageway therebetween for receipt of crop material;
   a blade bank including a plurality of blade elements, the blade bank being movable relative to the chopper grate assembly between an extended position at which the plurality of blade elements at least partially extend into the passageway and a retracted position at which the plurality of blade elements are at least partially retracted relative to the passageway;
   a bank support member configured to support the blade bank relative to the chopper grate assembly;
   a pivot support member non-rotatably coupled to the bank support member;
   a blade support body pivotally coupled to the pivot support member at a pivot axis defined between the pivot support member and the blade support member, the blade support body configured to be secured to at least one blade element of the plurality of blade elements of the blade bank; and a blade reset mechanism coupled to the blade support body at a first mounting location, the blade reset mechanism configured to apply a force against the blade support body that urges the blade support body to pivot about the pivot axis such that the at least one blade element is biased towards the extended position, wherein the pivot axis defined between the pivot support member and the blade support body is located further away from the chopper grate assembly than the first mounting location.

2. The chopper assembly of claim 1, wherein the blade reset mechanism is coupled between the blade support body and a fixed support arm, the blade reset mechanism being coupled to the fixed support arm at a second mounting location.

3. The chopper assembly of claim 2, wherein the fixed support arm extends outwardly relative to the bank support member such that the second mounting location is spaced apart laterally from the pivot axis a greater distance than the first mounting location.

4. The chopper assembly of claim 3, wherein the second mounting location is located further away from the chopper grate assembly than the first mounting location.

5. The chopper assembly of claim 1, wherein the blade reset mechanism comprises a spring-loaded mechanism.

6. The chopper assembly of claim 1, wherein the blade reset mechanism comprises an active-force device.

7. The chopper assembly of claim 1, wherein the blade support body is configured to pivot relative to the pivot support member against the force applied by the blade reset mechanism when the at least one blade element is subjected to a sufficient counterforce force such that the at least one blade element is moved towards the retracted position.

8. The chopper assembly of claim 1, further comprising an actuating mechanism configured to move the plurality of blade elements between the extended and retracted positions independent of the operation of the blade reset mechanism.

9. A chopper assembly for a harvester, the chopper assembly comprising:
a rotary chopper element;
a chopper grate assembly spaced apart from the rotary chopper element to form a passageway therebetween for receipt of crop material;
a blade bank including a plurality of blade elements, the blade bank being movable relative to the chopper grate assembly between an extended position at which the plurality of blade elements at least partially extend into the passageway and a retracted position at which the plurality of blade elements are at least partially retracted relative to the passageway;
a bank support member configured to support the blade bank relative to the chopper grate assembly;
a pivot support member non-rotatably coupled to the bank support member;
a blade support body pivotally coupled to the pivot support member at a pivot axis defined between the pivot support member and the blade support member, the blade support body configured to be secured to at least one blade element of the plurality of blade elements of the blade bank; and a blade reset mechanism coupled directly between the pivot support member and the blade support body, the blade reset mechanism being coupled to the blade support body at a first mounting location and to the pivot support member at a second mounting location, the blade reset mechanism configured to apply a force against the blade support body that urges the blade support body to pivot about the pivot axis such that the at least one blade element is biased towards the extended position.

10. The chopper assembly of claim 9, wherein the first mounting location is located further away from the chopper grate assembly than the pivot axis defined between the pivot support member and the blade support body.

11. The chopper assembly of claim 9, wherein the pivot support member extends between a first end positioned adjacent to the chopper grate assembly and a second end spaced apart from the first end, the pivot axis being defined adjacent to the first end of the pivot support member and the second mounting location being defined adjacent to the second end of the pivot support member.

12. The chopper assembly of claim 9, wherein the first mounting location is located closer to the chopper grate assembly than the second mounting location.

13. The chopper assembly of claim 9, wherein the pivot support member defines a first stop surface and the blade support body defines a second stop surface, the first and second stop surfaces contacting each other when the at least one blade element is moved to the extended position.

14. The chopper assembly of claim 9, wherein the blade reset mechanism is coupled between the blade support body and a fixed support arm of the pivot support member, the blade reset mechanism being coupled to the fixed support arm at the second mounting location.

15. The chopper assembly of claim 14, wherein the fixed support arm extends outwardly relative to the bank support member such that the second mounting location is spaced apart laterally from the pivot point a greater distance that the first mounting location.

16. The chopper assembly of claim 15, wherein the second mounting location is located further away from the chopper grate assembly than the first mounting location.

17. The chopper assembly of claim 9, wherein the blade reset mechanism comprises a spring-loaded mechanism.

18. The chopper assembly of claim 9, wherein the blade reset mechanism comprises an active-force device.

19. The chopper assembly of claim 9, wherein the blade support body is configured to pivot relative to the pivot support member against the three applied by the blade reset mechanism when the at least one blade element is subjected to a sufficient counterforce force such that the at least one blade element is moved towards the retracted position.

20. The chopper assembly of claim 9, further comprising an actuating mechanism configured to move the plurality of blade elements between the extended and retracted positions independent of the operation of the blade reset mechanism.

* * * * *